US011856354B2

United States Patent
Liu et al.

(10) Patent No.: US 11,856,354 B2
(45) Date of Patent: Dec. 26, 2023

(54) WIRELESS EARBUD, CHARGING BOX AND CHARGING SYSTEM FOR WIRELESS EARBUD

(71) Applicant: GOERTEK INC., Weifang (CN)

(72) Inventors: Zhenwu Liu, Shandong (CN); Chongguang Dai, Shandong (CN); Junjie Ni, Shandong (CN)

(73) Assignee: GOERTEK INC., Weifang (CN)

( * ) Notice: Subject to any disclaimer, the term of this patent is extended or adjusted under 35 U.S.C. 154(b) by 322 days.

(21) Appl. No.: 17/392,496

(22) Filed: Aug. 3, 2021

(65) Prior Publication Data

US 2021/0368256 A1  Nov. 25, 2021

Related U.S. Application Data

(63) Continuation of application No. PCT/CN2019/129579, filed on Dec. 28, 2019.

(30) Foreign Application Priority Data

Sep. 20, 2019 (CN) .......................... 201910896527.X

(51) Int. Cl.
 *H04R 1/10* (2006.01)
 *H02J 7/00* (2006.01)
(52) U.S. Cl.
 CPC .......... *H04R 1/1041* (2013.01); *H02J 7/0044* (2013.01); *H04R 1/1016* (2013.01); *H04R 2420/07* (2013.01)
(58) Field of Classification Search
 None
 See application file for complete search history.

(56) References Cited

U.S. PATENT DOCUMENTS 10,735,845 B2 * 8/2020 Lee .................. H02J 7/0045
11,128,149 B2 * 9/2021 Chien ............... H02J 7/007182
11,349,328 B2 * 5/2022 Cheng .................... H04B 3/548

FOREIGN PATENT DOCUMENTS

CN  107887950 A  4/2018
CN  108769856 A  11/2018
(Continued)

OTHER PUBLICATIONS

English language translation of CN107887950, Cheng (Year: 2018).*
(Continued)

*Primary Examiner* — Paul W Huber

(57) ABSTRACT

Disclosed is a wireless earbud, which includes: a charging port configured to be connected to an earbud charging voltage and receive/send a communication signal; a communication switching circuit including a first input/output terminal connected to the charging port and a second input/output terminal, the communication switching circuit is configured to switch to an off state when the charging port is connected to the earbud charging voltage, and switch to an on state when the charging port is connected to the communication signal; a communication on-off circuit connected to the second input/output terminal of the communication switching circuit; and an earbud control circuit configured to perform box entry detection on the wireless earbud and generate a corresponding detection signal to control the communication switching circuit to turn on/off an electrical connection between the earbud control circuit and the communication on-off circuit according to the detection signal.

12 Claims, 2 Drawing Sheets

(56) References Cited

FOREIGN PATENT DOCUMENTS

| | | |
|---|---|---|
| CN | 109495807 A | 3/2019 |
| CN | 110572736 A | 12/2019 |
| EP | 2390969 A1 | 11/2011 |

OTHER PUBLICATIONS

English language translation of CN109495807, Yang (Year: 2019).*
The First Chinese Office Action dated May 22, 2020; Appln. No. 201910896527.X.
The Second Chinese Office Action dated Nov. 23, 2020; Appln. No. 201910896527.X.
The International Search Report dated Jun. 23, 2020; PCT/CN2019/129579.

* cited by examiner

WIRELESS EARBUD, CHARGING BOX AND CHARGING SYSTEM FOR WIRELESS EARBUD

CROSS REFERENCE TO RELATED APPLICATIONS

This disclosure is a Continuation Application of International Application No. PCT/CN2019/129579, filed on Dec. 28, 2019 which claims the priority to Chinese Patent Application 201910896527.X, entitled "WIRELESS EARBUD, CHARGING BOX AND CHARGING SYSTEM FOR WIRELESS EARBUD", submitted to the China National Intellectual Property Administration on Sep. 20, 2019, which is hereby incorporated by reference in its entirety.

TECHNICAL FIELD

This disclosure relates to the technical field of wireless earbuds, in particular to a wireless earbud, a charging box and a charging system for the wireless earbud.

BACKGROUND

With the rapid development of earbuds technology, wireless earbuds, especially Bluetooth earbuds, are increasingly widely used. The latest True Wireless Stereo (TWS) earbuds are a typical product in wireless earbuds that combines intelligence and wireless trends well. TWS earbuds have already held a certain share in the earbud market by virtue of their freedom to wear and good sound quality. Most wireless earbuds have their own internal power supply, such as storage battery, but their own power supply generally has limited capacity, so it is usually necessary to use a charging box to charge the wireless earbuds. The charging box can communicate with the earbuds to realize TWS earbuds forced pairing, opening and closing actions of box and OTA upgrade.

At present, a charging interface and a communication interface are usually set between the charging box and the wireless earbuds, so there are a lot of connection contacts on the wireless earbuds.

SUMMARY

The main object of this disclosure is to provide a wireless earbud, a charging box and a charging system for the wireless earbud, which aims to realize the multiplexing of charging and communication at the charging port, and can reduce the number of contact points between the wireless earbuds and the charging box.

In order to achieve the above object, this disclosure provides a wireless earbud, which includes:
  a charging port configured to be connected to an earbud charging voltage and receive/send a communication signal;
  a communication switching circuit including:
    a first input/output terminal connected to the charging port; and
    a second input/output terminal;
    the communication switching circuit is configured to switch to an off state when the charging port is connected to the earbud charging voltage, and switch to an on state when the charging port is connected to the communication signal;
  a communication on-off circuit connected to the second input/output terminal of the communication switching circuit; and
  an earbud control circuit configured to perform box entry detection on the wireless earbud and generate a corresponding detection signal to control the communication switching circuit to turn on/off an electrical connection between the earbud control circuit and the communication on-off circuit according to the detection signal.

Optionally, the wireless earbud further includes:
  a charging on-off circuit, an input terminal of the charging on-off circuit being connected to the charging port, and the charging on-off circuit being configured to:
    turn on to be connected to the earbud charging voltage when the charging port is connected to the earbud charging voltage; and
    turn off to stop earbud charging when the charging port is connected to the communication signal.

Optionally, the wireless earbud further includes an energy storage component, and the charging on-off circuit includes:
  a first MOS transistor, a source of the first MOS transistor being the input terminal of the charging on-off circuit, and a drain of the first MOS transistor being connected to the energy storage component of the wireless earbud;
  a first resistor; and
  a second resistor; where:
  a first terminal of the first resistor is connected to a first DC power supply, a second terminal of the first resistor is grounded through the second resistor, and a common terminal of the first resistor and the second resistor is connected to a gate of the first MOS transistor.

Optionally, the first MOS transistor is turned on when a voltage value output by the common terminal of the first resistor and the second resistor is less than a voltage value of the charging port; and the first MOS transistor is turned off when the voltage value output by the common terminal of the first resistor and the second resistor is greater than or equal to the voltage value of the charging port.

Optionally, the communication switching circuit includes:
  a second MOS transistor, a source of the second MOS transistor being the second input/output terminal of the communication switching circuit, and a drain of the second MOS transistor being the first input/output terminal of the communication switching circuit; and
  a first pull-up resistor, a first terminal of the first pull-up resistor being connected to a first DC power supply, and a second terminal of the first pull-up resistor being connected to a gate of the second MOS transistor.

Optionally, the earbud control circuit includes:
  an earbud main controller, a data transmission terminal of the earbud main controller being connected to the communication switching circuit;
  a position detection sensor, where:
    an output terminal of the position detection sensor is connected to a controlled terminal of the communication switching circuit, and is configured to perform the box entry detection on the wireless earbud and generate the corresponding detection signal to control the communication switching circuit to turn on/off the electrical connection between the earbud control circuit and the communication on-off circuit; or
    the output terminal of the position detection sensor is connected to the earbud main controller, and is configured to perform the box entry detection on the wireless earbud and generate the corresponding detection signal; the earbud main controller is further configured to control the communication switching circuit to turn on/off the electrical connection between the earbud control circuit and the communication on-off circuit according to the detection signal.

Optionally, the earbud control circuit further includes:

a second pull-up resistor, one terminal of the second pull-up resistor being connected to the first DC power supply, and the other terminal of the second pull-up resistor being connected to a communication terminal of the earbud main controller.

This disclosure further provides a charging box, which includes:

a power interface configured to be connected to an earbud charging voltage and receive/send a communication signal;

a power supply configured to output the earbud charging voltage;

a communication/charging switching circuit including:
 a common terminal connected to the power interface;
 a charging output terminal connected to the power supply; and
 a communication transmission terminal;

a charging box main controller, a data transmission terminal of the charging box main controller being connected to the communication transmission terminal of the communication/charging switching circuit, and the charging box main controller being configured to control the communication/charging switching circuit to switch between an electrical connection between the common terminal and the charging output terminal and an electrical connection between the common terminal and the communication transmission terminal.

Optionally, the charging box further includes a charging control switch, and the charging control switch includes:

a controlled terminal connected to the charging box main controller;

an input terminal connected to the power supply; and an output terminal connected to the charging output terminal of the communication/charging switching circuit.

This disclosure further provides a charging system for a wireless earbud, which includes the wireless earbud as described above, and the charging box as described above.

This disclosure provides an earbud control circuit and a communication on-off circuit. The earbud control circuit is configured to perform box entry detection on the wireless earbud and generate a corresponding detection signal to control the communication switching circuit to turn on/off an electrical connection between the earbud control circuit and the communication on-off circuit according to the detection signal. The communication switching circuit is configured to switch to an off state when the charging port is connected to the earbud charging voltage, and switch to an on state when the charging port is connected to the communication signal. In this disclosure, when the communication on-off circuit is turned on, or when the communication switching circuit is turned on when the charging port is connected to the communication signal, the communication between the charging box and the wireless earbud is realized; and when the communication on-off circuit is turned off, or when the communication switching circuit is turned off when the charging port is connected to the earbud charging voltage, the communication between the charging box and the wireless earbud is cut off. With this arrangement, the multiplexing of charging and communication at the charging port is realized, and the number of contact points between the wireless earbuds and the charging box can be reduced.

BRIEF DESCRIPTION OF THE DRAWINGS

In order to more clearly explain the embodiments of the present disclosure or the technical solutions in the prior art, the drawings used in the description of the embodiments or the prior art will be briefly introduced below. Obviously, the drawings in the following description are merely some embodiments of the present disclosure. For those of ordinary skill in the art, other drawings can be obtained based on the structure shown in these drawings without paying creative work.

Figure 1:
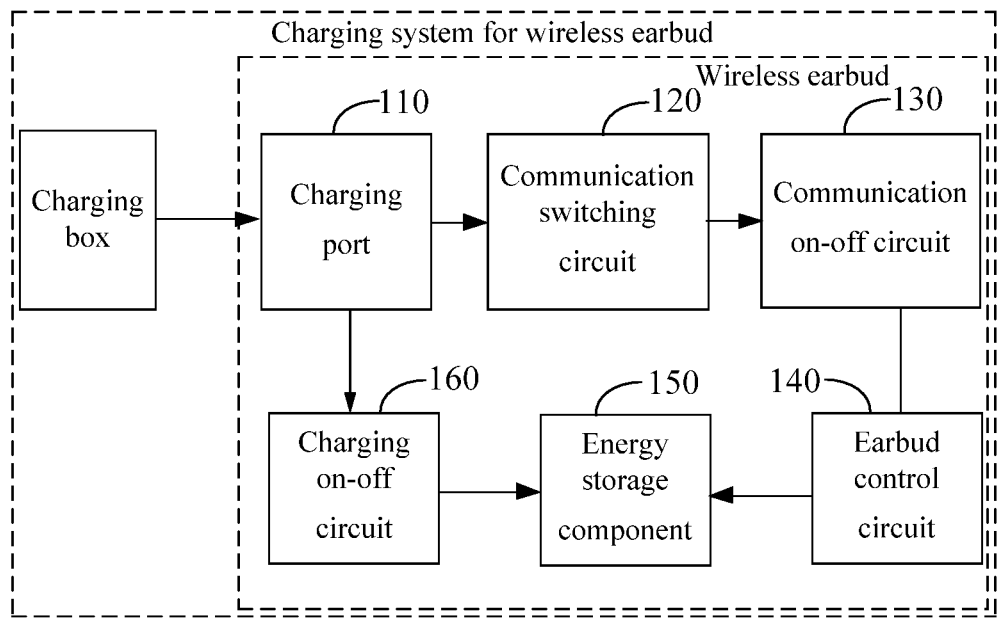
FIG. 1 is a schematic diagram of functional modules of a wireless earbud applied to a charging system for the wireless earbud according to an embodiment of this disclosure.

The realization of the objects, functional characteristics and advantages of this disclosure will be further described in conjunction with the embodiments and with reference to the drawings.

DETAILED DESCRIPTION OF THE EMBODIMENTS

In the following, the technical solutions in the embodiments of this disclosure will be clearly and completely described with reference to the drawings in the embodiments of this disclosure. Obviously, the described embodiments are only a part of the embodiments of this disclosure, and not all of the embodiments. Based on the embodiments of this disclosure, all other embodiments obtained by those of ordinary skill in the art without creative efforts shall fall within the claimed scope of this disclosure.

It should be noted that all directional indicators (such as up, down, left, right, front, back, etc.) in the embodiments of this disclosure are only used to explain the relative positional relationship, movement situation, etc. between components in a specific posture (as shown in the drawings). If the specific posture changes, the directional indication also changes accordingly.

In addition, the descriptions related to "first", "second", and the like in this disclosure are for descriptive purposes only, and cannot be understood as indicating or implying their relative importance or implicitly indicating the number of technical features indicated. Therefore, a features associated with "first" and "second" may explicitly or implicitly include at least one of such feature. In addition, the technical solutions between the various embodiments can be combined with each other, but they must be based on what can be achieved by those of ordinary skill in the art. When the combination of technical solutions is contradictory or cannot be achieved, it should be considered that such a combination of technical solutions does not exist, nor within the protection scope of this disclosure.

The term "and/or" in this article is merely an association relationship describing an associated object, indicating that there may be three relationships, for example, A and/or B, and that there may be three situations: A alone, A and B at the same time, and B alone. In addition, the character "/" in this article generally means that the related objects are an "or" relationship.

This disclosure provides a wireless earbud.

With the rapid development of earbuds technology, wireless earbuds, especially Bluetooth earbuds, are increasingly widely used. The latest True Wireless Stereo (TWS) earbuds are a typical product in wireless earbuds that combines intelligence and wireless trends well. TWS earbuds have already held a certain share in the earbud market by virtue of their freedom to wear and good sound quality. This kind of wireless earbuds are also used more and more frequently in a variety of situations, and the single use time is also getting longer. Moreover, in the actual use, people often establish a communication link between wireless earbuds and a smart electronic device, such as a mobile phone or a smart watch, use the wireless earbuds to play voice, such as a call or a music lamp, and collect the user's voice, and output it to the smart electronic device through a wireless communication module configured in the wireless earbuds. Although TWS earbuds are small and convenient, they are not as powerful as traditional neck-hanging and Bluetooth headsets, and Bluetooth transmission between ears cannot avoid power consumption. Most wireless earbuds have their own internal power supply, such as storage battery, but their own power supply generally has limited capacity, so it is usually necessary to use earbud charging devices to charge the wireless earbuds. The earbud charging devices are mostly set in the shape of a charging box. When the wireless earbuds are not in use, they can also be stored in the charging box to avoid loss. The charging box can communicate with the earbuds to realize TWS earbuds forced pairing, opening and closing actions of box and OTA upgrade.

The charging box needs to charge the wireless earbuds, and the charging box and the wireless earbuds also need to realize communication. At present, charging interfaces and communication interfaces are usually set between the charging box and the wireless earbuds, so that there are a lot of connection contacts on the wireless earbuds.

Figure 3:
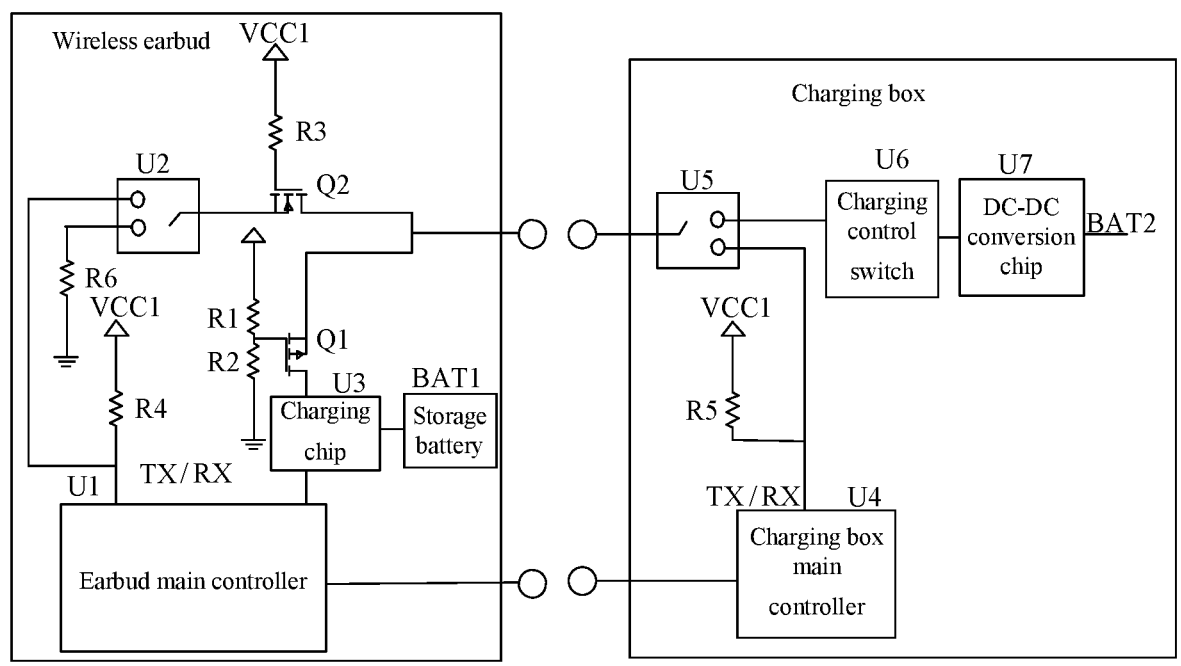
FIG. 3 is a schematic diagram of a circuit structure of the charging system for the wireless earbud according to an embodiment of this disclosure.

In order to solve the above-mentioned problem, referring to FIGS. 1 and 3, in an embodiment of this disclosure, the wireless earbud includes:
- a charging port 110 configured to be connected to an earbud charging voltage and receive/send a communication signal;
- a communication switching circuit 120 including:
  - a first input/output terminal connected to the charging port; and
  - a second input/output terminal;
  - the communication switching circuit 120 is configured to switch to an off state when the charging port 110 is connected to the earbud charging voltage, and switch to an on state when the charging port 110 is connected to the communication signal;
- a communication on-off circuit 130 connected to the second input/output terminal of the communication switching circuit 120; and
- an earbud control circuit 140 configured to perform box entry detection on the wireless earbud and generate a corresponding detection signal to control the communication switching circuit 120 to turn on/off an electrical connection between the earbud control circuit 140 and the communication on-off circuit 130 according to the detection signal.

In this embodiment, the charging port 110 can be implemented by using a pogo pin connector, and the charging port 110 can be connected to the power interface 210 of the charging box, so as to output the power supply 220 of the charging box to the earbud for charging. The charging port 110 may be disposed at the tail of the earbud housing. In some embodiments, the charging port 110 may also be a metal interface, such as a metal probe, a metal elastic sheet, or the like, and be located at the tail of the earbud housing.

The communication on-off circuit 130 may be implemented by using a first single-pole double-throw switch U2, such as an analog switch. A common terminal of the first single-pole double-throw switch U2 is connected to the second input/output terminal of the communication switching circuit 120, one output terminal of the first single-pole double-throw switch U2 is connected to the earbud control circuit 140, and the other output terminal of the first single-pole double-throw switch U2 may be connected to a pull-down resistor R6. When the common terminal is connected to the earbud control circuit 140, the communication path between the earbud control circuit 140 and the charging box can be turned on, and when the common terminal is connected to the pull-down resistor R6, the communication path between the earbud control circuit 140 and the charging box can be turned off.

One terminal of the communication switching circuit 120 is connected to the charging port 110, and the other terminal of the communication switching circuit 120 is connected to the communication on-off circuit 130. It can be understood that the wireless earbud and the charging box are both provided with a main control chip, and a power supply voltage of the main control chip is usually 3.3V or 1.8V, the voltage value of the communication signal output by the main control chip is also 3.3V or 1.8V, and the power of the energy storage component 150 in the wireless earbud is usually 5V. Therefore, it is possible to control whether the wireless earbud is switched to the communication mode or the charging mode according to the voltage value of the signal connected to the charging port 110. Specifically, when the charging box needs to output a communication signal to the earbud control circuit 140 to realize communication between the charging box and the wireless earbud, the communication switching circuit 120 is turned on upon receiving the communication signal, so that the communication signal of the charging port 110 can be output to the earbud control circuit 140 through the communication on-off circuit 130. When the charging box needs to output the earbud charging voltage, the communication switching circuit 120 is cut off upon receiving the charging signal, thereby cutting off the communication loop between the earbud control circuit 140 and the charging box. At this time, the earbud charging voltage of the charging box charges the energy storage component 150 in the wireless earbud through the charging loop of the wireless earbud.

It can be understood that the communication switching circuit 120 does not need to be controlled by the earbud control circuit 140, and is directly controlled based on the communication signal/the earbud charging voltage connected by the charging port 110, which can reduce the control program of the earbud control circuit 140, and can also increase the switching speed of the charging on-off circuit 160, thereby improving the response speed of the wireless earbud.

This disclosure provides an earbud control circuit 140 and a communication on-off circuit 130. The earbud control circuit 140 is configured to perform box entry detection on the wireless earbud and generate a corresponding detection signal to control the communication switching circuit 120 to turn on/off an electrical connection between the earbud control circuit 140 and the communication on-off circuit 130 according to the detection signal. The communication switching circuit 120 is configured to switch to an off state when the charging port 110 is connected to the earbud charging voltage, and switch to an on state when the charging port 110 is connected to the communication signal. In this disclosure, when the communication on-off circuit 130 is turned on, or when the communication switching circuit 120 is turned on when the charging port 110 is connected to the communication signal, the communication between the charging box and the wireless earbud is realized; and when the communication on-off circuit 130 is turned off, or when the communication switching circuit 120 is turned off when the charging port 110 is connected to the earbud charging voltage, the communication between the charging box and the wireless earbud is cut off. With this arrangement, the multiplexing of charging and communication at the charging port 110 is realized, and the number of contact points between the wireless earbuds and the charging box can be reduced.

Referring to FIGS. 1 and 3, in an embodiment, the earbud control circuit 140 includes:

an earbud main controller U1, a data transmission terminal of the earbud main controller U1 being connected to the communication switching circuit 130;

a position detection sensor (not shown in the figures), where:

an output terminal of the position detection sensor is connected to a controlled terminal of the communication switching circuit 120, and is configured to perform the box entry detection on the wireless earbud and generate the corresponding detection signal to control the communication switching circuit 120 to turn on/off the electrical connection between the earbud control circuit 140 and the communication on-off circuit 130; or the output terminal of the position detection sensor is connected to the earbud main controller U1, and is configured to perform the box entry detection on the wireless earbud and generate the corresponding detection signal; the earbud main controller U1 is further configured to control the communication switching circuit 120 to turn on/off the electrical connection between the earbud control circuit 140 and the communication on-off circuit 130 according to the detection signal.

The earbud main controller U1 can be implemented by using a dedicated wireless earbud control chip in the wireless earbud, such as a Bluetooth chip, and can also be implemented by using an independent microprocessor, which is not limited here. The earbud main controller U1 can be microprocessors such as single chip microcomputer, DSP and FPGA. Those skilled in the art can integrate some hardware circuits and software programs or algorithms in the earbud main controller U1, use various interfaces and lines to connect various parts of the entire wireless earbud, run or execute software programs and/or modules in the earbud main controller U1, and call data in the earbud main controller U1, perform various functions of the wireless earbud and process data to monitor the wireless earbud as a whole.

In this embodiment, the position detection sensor can be a detection element such as an elastic piece or a sensor that can detect whether the earbud enters the box, the sensor can be a Hall sensor, an infrared sensor, and the like that can detect the position, and the elastic piece can be a micro switch. When it is detected that the earbud is put into the charging box, the communication on-off circuit 130 can be triggered to close, and then communication preparation is carried out between the charging box main controller U4 in the charging box and the earbud main controller U1 of the wireless earbud. When the charging port 110 is connected with the communication signal, information interaction can be carried out between the wireless earbud and the charging box.

The position detection sensor can output the position detection signal to the earbud main controller U1, and the earbud main controller U1 controls on/off of the communication on-off circuit 130, or the position detection sensor directly controls on/off of the communication on-off circuit 130 according to the detected position information of the wireless earbud, so that the algorithms and software control programs of the earbud main controller U1 can be reduced. In addition, the switching speed of the charging on-off circuit 160 can be increased by the direct control of the position detection sensor, thereby improving the response speed of the wireless earbud.

In the above embodiment, a first pull-up resistor R4 is further connected to a communication pin of the earbud main controller U1. One terminal of the first pull-up resistor R4 is connected to the first DC power supply VCC1, and the other terminal of the first pull-up resistor R4 is connected to the communication pin of the earbud main controller U1. The normal level of the communication pin is a high level, and when communication needs to be realized, the level of the communication pin can be pulled, and the transmission of communication signals can be realized according to the pulse output of high and low levels.

Referring to FIGS. 1 and 3, in an embodiment, the wireless earbud further includes an energy storage component 150, and the energy storage component 150 includes a charging chip U3 and a battery BAT1. A controlled terminal of the charging chip U3 is connected to the earbud main controller U1, the charging chip U3 is controlled by the earbud main controller U1, the battery BAT1 is connected to the charging chip U3 through a DC bus, and the charging chip U3 is configured to charge the battery BAT1. The charging chip U3 generally has a sleeping state, that is, a standby state, a normal working state, and an off state. The charging chip U3 may also be provided with a DC-DC conversion circuit to convert the connected power supply voltage into the energy storage voltage of the battery BAT1 and output it. The charging chip U3 can also perform trickle charging, constant current charging, or constant voltage charging on the battery BAT1, so as to realize charging modes such as fast charging or slow charging on the battery BAT1. The storage power range of the battery can be set to 3.5-5V, specifically 3.9V, 4.3V, etc. The battery can be realized by using rechargeable batteries such as lithium ion storage batteries or nickel hydrogen batteries.

It should be noted that, in some embodiments, when the earbud is put into the charging box, or after the earbud main controller U1 of the earbud communicates with the charging box, that is, when the wireless earbud is charged, there may be sufficient power of the wireless earbud, and at this time, the charging box will also automatically charge the wireless earbud, which may cause the wireless earbud to be damaged due to overcharging.

Referring to FIG. 1 and FIG. 3, for this purpose, in an optional embodiment, the wireless earbud may further include:

a voltage detection circuit (not shown in the figures), a detection terminal of the voltage detection circuit being connected to the energy storage component 150, an output terminal of the voltage detection circuit being connected to the earbud main controller U1, and the voltage detection circuit being configured to detect power of the energy storage component 150 and output a power detection signal.

The chip of the earbud main controller U1 may be provided with a feedback pin that receives the battery power detection signal, and determines the current power of the battery according to the power detection signal. When the communication on-off circuit 130 is turned on, the earbud main controller U1 can interact with the charging box through the communication on-off circuit 130 and the communication switching circuit 120 for information such as power information or working status, so that the charging box formulates a charging strategy for the wireless earbud according to the power information. For example, when the battery power is sufficient, no electric energy is output, and the charging box plays a role of storage. When the battery needs to be charged, the total amount of electric energy that the charging box needs to output, the charging time, and whether one or more combined charging methods of constant voltage charging, constant current charging, and trickle charging can be calculated. The earbud main controller U1 can also protect the battery against overvoltage and undervoltage according to the signal.

Referring to FIGS. 1 and 3, in an embodiment, the wireless earbud further includes:
  a charging on-off circuit 160, an input terminal of the charging on-off circuit 160 being connected to the charging port 110, and the charging on-off circuit 160 being configured to:
    turn on to be connected to the earbud charging voltage when the charging port 110 is connected to the earbud charging voltage; and
    turn off to stop earbud charging when the charging port 110 is connected to the communication signal.

In this embodiment, the charging on-off circuit 160 is controlled based on the communication signal/the earbud charging voltage connected by the charging port 110. When the charging box needs to output the communication signal to the earbud control circuit 140 to realize the communication between the charging box and the wireless earbud, the charging on-off circuit 160 is turned off upon receiving the communication signal, so as to cut off the electrical connection between the charging port 110 and the energy storage component 150, at this time, the communication signal will not be output to the energy storage assembly 150. However, when the charging box needs to output the earbud charging voltage, the charging on-off circuit 160 is turned on upon receiving the earbud charging voltage, at this time, the earbud charging voltage of the charging box is configured to charge the energy storage component 150 in the wireless earbud through the charging on-off circuit 160 of the wireless earbud. It can be understood that the charging on-off circuit 160 does not need to be controlled by the earbud control circuit 140, and is directly controlled based on the communication signal/the earbud charging voltage connected by the charging port 110, which can reduce the control programs of the earbud control circuit 140, and can also increase the switching speed of the charging on-off circuit 160, thereby improving the response speed of the wireless earbud. The charging on-off circuit 160 and the communication switching circuit 120 are independently controlled to realize charging and communication functions respectively, which is beneficial to the separation of charging power supply and communication signals and prevents crosstalk of signals.

Referring to FIGS. 1 and 3, in an embodiment, the charging on-off circuit 160 includes:
  a first MOS transistor Q1, a source of the first MOS transistor Q1 being the input terminal of the charging on-off circuit 160, and a drain of the first MOS transistor Q1 being connected to the energy storage component 150 of the wireless earbud;
  a first resistor R1; and
  a second resistor R2; where:
  a first terminal of the first resistor R1 is connected to a first DC power supply VCC1, a second terminal of the first resistor R1 is grounded through the second resistor R2, and a common terminal of the first resistor R1 and the second resistor R2 is connected to a gate of the first MOS transistor Q1.

In this embodiment, the first MOS transistor Q1 can be implemented by using a P-MOS transistor, and the first resistor R1 and the second resistor R2 form a voltage divider circuit to divide the received voltage of the first DC power supply VCC1 and output it to the gate of the first MOS transistor Q1, so as to provide a gate voltage for the first MOS transistor Q1, and the first DC power supply VCC1 may be a power supply voltage of the earbud control circuit 140. It can be understood that the larger the ratio of the first resistor R1 to the second resistor R2, the larger the voltage value on the second resistor R2, and therefore the voltage value output to the gate of the first MOS transistor Q1 can be adjusted by adjusting the resistance values of the first resistor R1 and the second resistor R2. The first MOS transistor Q1 is turned on when a voltage value output by the common terminal of the first resistor R1 and the second resistor R2 is less than a voltage value of the charging port 110; and the first MOS transistor Q1 is turned off when the voltage value output by the common terminal of the first resistor R1 and the second resistor R2 is greater than or equal to the voltage value of the charging port 110.

That is, when the wireless earbud is put into the charging box, a current flows through the charging port 110. If the charging port 110 is connected to the earbud charging voltage of the wireless earbud, the voltage value is greater than the voltage division values of the first resistor R1 and the second resistor R2, and at this time $V_{GS}<0$, so that the first MOS transistor Q1 is turned on and the energy storage component 150 is charged.

If the charging port 110 is connected with the communication signal of the charging box, the voltage value is less than or equal to the voltage division values of the first resistor R1 and the second resistor R2, and at this time $V_{GS} \geq 0V$, so that the first MOS transistor Q1 is turned off, and the communication signal is prevented from entering the energy storage component 150. In this embodiment, a voltage divider circuit composed of the first resistor R1 and the second resistor R2 is provided to continuously output a preset voltage value to the MOS transistor, and then the MOS transistor is controlled to be turned on by the voltage value connected to the charging port 110. The control of charging the wireless earbud energy storage component 150 can be realized through a hardware circuit without software control.

Referring to FIGS. 1 and 3, in an embodiment, the communication switching circuit 120 includes:
  a second MOS transistor Q2, a source of the second MOS transistor Q2 being the second input/output terminal of the communication switching circuit 120, and a drain of the second MOS transistor Q2 being the first input/output terminal of the communication switching circuit 120; and a first pull-up resistor R3, a first terminal of the first pull-up resistor R3 being connected to a first DC power supply VCC1, and a second terminal of the first pull-up resistor R3 being connected to a gate of the second MOS transistor Q2.

In this embodiment, the first DC power supply VCC1 may be a power supply voltage of the earbud control circuit 140, and the voltage value of the first DC power supply VCC1 is less than the earbud charging voltage value. The second MOS transistor Q2 can be implemented as a N-MOS transistor. When the wireless earbud is put into the charging box, a current flows through the charging port 110.

If the charging port 110 is connected to the earbud charging voltage of the wireless earbud, the voltage value is greater than the voltage value of the first DC power supply VCC1, and at this time VGS=0, so that the second MOS transistor Q2 is turned off, and the first MOS transistor Q1 is turned on and charges the energy storage component 150.

If the charging port 110 is connected to the communication signal of the charging box, the communication signal is a high level of 1.8V or a low level of 0V. When the charging port 110 is 0V, although for the second MOS transistor Q2 VGS=0V, the second MOS transistor Q2 is in a cut-off state, and the level at the source S will be pulled down by the drain D through the diode inside the second MOS transistor Q2, and it is realized that the low level is transferred from the charging port 110 to the earbud control circuit 140. When the charging port 110 is 1.8V, the second MOS transistor Q2 is in the cut-off state, and the pull-up resistor R3 is set to output a pull-up level of 1.8V to the earbud control circuit 140, thereby indirectly transferring the high level from the charging port 110 to the earbud control circuit 140 side. In this embodiment, the gate of the second MOS transistor Q2 is pulled up, a preset voltage value is continuously output to the MOS transistor, and then the MOS transistor is controlled to turn on/off by the voltage connected by the charging port 110, and communication control of the earbud control circuit 140 the wireless earbud can be realized by using a hardware circuit without software control.

When the wireless earbud needs to send a communication signal to the charging box, and when a low level of 0V is output to the source of the second MOS transistor Q2, VGS of the second MOS transistor Q2 is greater than 0V and the second MOS transistor Q2 is turned on, so as to output a low level communication signal to the charging box. When a high level signal of 1.8V is output to the source of the second MOS transistor Q2, VGS of the second MOS transistor Q2 is equal to 0V and the second MOS transistor Q2 is turned off. The controller side of the charging box may also be connected with a pull-up resistor R4. One terminal of the pull-up resistor R4 is connected to the first DC power supply VCC1, and the other terminal of the pull-up resistor R4 is connected to the communication pin of the charging box main controller U4. The normal level of the communication pin is a high level, and when communication needs to be realized, the level of the communication pin can be pulled down, and the transmission of communication signals can be realized according to the pulse output of high and low levels.

It can be understood that in the above embodiment, the communication on-off circuit 130 and the communication switching circuit 120 can realize automatic switching of charging and communication functions only by simple discrete components, which have the characteristics of small device placement space, low cost, simple control logic, etc., and can reduce the production cost of the wireless earbud. In addition, the wireless module does not need to be provided in this embodiment. For example, when using the dedicated IC to realize the communication between the charging box and the wireless earbud, it is necessary to set the wireless communication module in the charging box.

Figure 2:
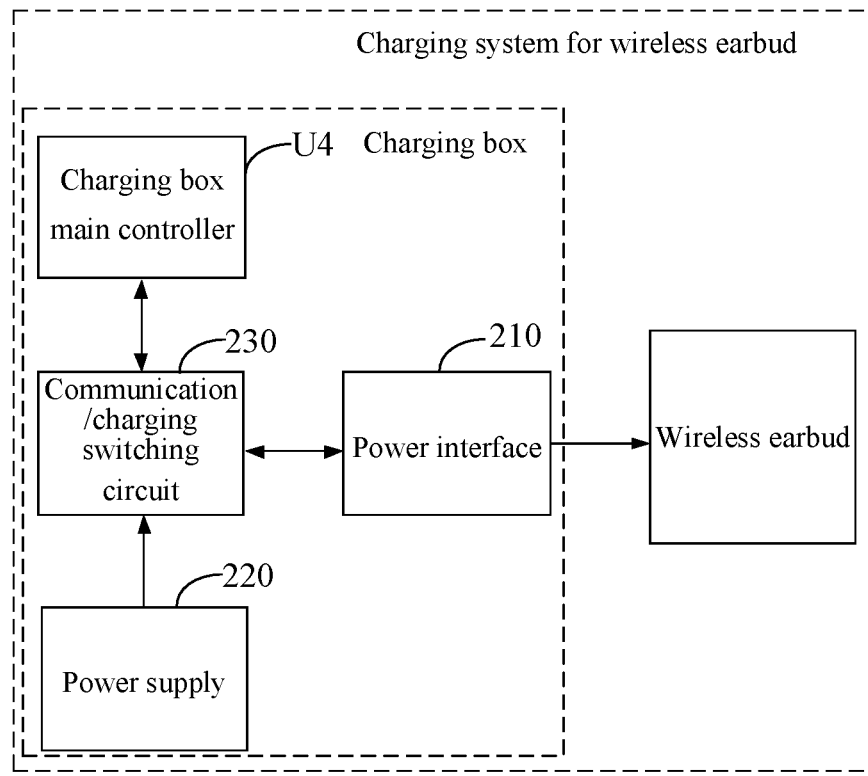
FIG. 2 is a schematic diagram of functional modules of a charging box applied to the charging system for the wireless earbud according to an embodiment of this disclosure.

This disclosure further provides a charging box. Referring to FIGS. 2 and 3, the charging box includes:
  a power interface 210 configured to be connected to an earbud charging voltage and receive/send a communication signal;
  a power supply 220 configured to output the earbud charging voltage;
  a communication/charging switching circuit 230 including:
    a common terminal connected to the power interface 210;
    a charging output terminal connected to the power supply 220; and
    a communication transmission terminal;
  a charging box main controller U4, a data transmission terminal of the charging box main controller U4 being connected to the communication transmission terminal of the communication/charging switching circuit 230, and the charging box main controller U4 being configured to control the communication/charging switching circuit 230 to switch between an electrical connection between the common terminal and the charging output terminal and an electrical connection between the common terminal and the communication transmission terminal.

In this embodiment, an earbud base may be arranged in the charging box, and a metal interface, such as a metal probe, a metal elastic sheet, etc., is configured in the earbud base to realize the power interface 210. The power interface 210 is adapted to the charging port 110 of the wireless earbud. For example, when the wireless earbud is implemented by using the pogo pin connector, the power interface 210 can be implemented by using the pogo pin connector as well. When the wireless earbud 100 is placed on the earbud base of the charging box, the charging port 110 of the wireless earbud is in contact with the metal interface of the charging box. Since the metal interfaces are all conductive substances, at this time, the wireless earbud is electrically connected to the charging box. Since the wireless earbuds are generally used for human ears, the wireless earbuds may include a pair of symmetrical housings, and the charging box may be correspondingly provided with a pair of power interfaces 210. The charging box can also be used to store the earbuds when the wireless earbuds are in a non-charging state. In some embodiments, the electrical connector may further be provided with a magnetic conductive member, so as to ensure that the connector of the charging box and the electrical connector of the wireless earbud can be tightly connected when the earbud is placed on the electrical connector of the charging box, so as to prevent the wireless earbud or the charging box from being damaged due to poor contact between the connectors.

The power supply 220 includes a battery BAT2 and a power conversion circuit. The power conversion circuit can be implemented by a DC-DC conversion chip U7. The charging box main controller U4 and the power conversion circuit of this embodiment are arranged on an electric control board, and the battery and the power conversion circuit can be electrically connected through a flexible circuit board. The power conversion circuit is provided with an enable pin, the charging box main controller U4 can output an enable signal to control the power conversion circuit to operate, and the charging box main controller U4 can control the interruption time of the power output by the power supply 220 by controlling the interruption time of the enable signal.

In this embodiment, the communication/charging switching circuit 230 can be implemented by using a second single-pole double-throw switch U5, such as an analog switch. A common terminal of the second single-pole double-throw switch U5 is connected to the power interface 210, one input terminal is connected to the charging box main controller U4, and the other terminal is connected to the power supply 220. When the common terminal is connected to the charging box main controller U4, the communication path between the charging box main controller U4 and the wireless earbud can be connected, and when the common terminal is connected to the power supply 220, the charging power can be provided to the wireless earbud.

Referring to FIGS. 2 and 3, in some embodiments, the charging box further includes a box opening/closing detection circuit (not shown in the figures). The box opening/closing detection circuit can use sensors such as a Hall sensor and an infrared sensor to detect the state of the box. The wireless earbud can be put into the charging box only after the upper cover of the charging box is opened when the wireless earbud is put into the box or the earbud is taken out from the box, so when it is detected that the upper cover of the charging box is not opened, other circuit modules in the charging box and the charging box main controller U4 can be controlled to enter the sleeping state.

When it is detected that the upper cover of the charging box is opened, it means that the user needs to put the earbud into the box for charging or storage. Therefore, when it is detected that the wireless earbud is entered into the box, the common terminal of the communication/charging switching circuit 230 can be controlled to connect with the communication transmission terminal, so as to realize the connection between the charging box and the communication transmission terminal of the wireless earbud. After the communication between the charging box and the wireless earbud is completed, if it is necessary to charge the wireless earbud, the common terminal of the communication/charging switching circuit 230 can be controlled to connect with the charging output terminal to provide a charging voltage for the wireless earbud. If it is necessary for the charging box to communicate with the wireless earbud during charging, the common terminal of the communication/charging switching circuit 230 can be controlled to switch to the communication transmission terminal again. According to the application requirements, the communication/charging switching circuit 230 can be controlled to switch between the communication function and the charging function, the multiplexing of charging and communication at the charging port 110 is realized, and the number of contact points between the wireless earbuds and the charging box can be reduced.

A third pull-up resistor R5 may also be connected to the controller side of the charging box. One terminal of the third pull-up resistor R5 is connected to the first DC power supply VCC1, and the other terminal of the third pull-up resistor R5 is connected to the communication pin of the charging box main controller U4. The normal level of the communication pin is a high level, and when communication needs to be realized, the level of the communication pin can be pulled, and the transmission of communication signals can be realized according to the pulse output of high and low levels.

Referring to FIGS. 2 and 3, in an embodiment, the charging box further includes a charging control switch U6, the charging control switch U6 includes:
- a controlled terminal connected to the charging box main controller U4;
- an input terminal connected to the power supply 220; and
- an output terminal connected to the charging output terminal of the communication/charging switching circuit 230.

The charging control switch U6 is configured to control the power output of the charging box. The charging control switch U6 can be controlled by the charging box main controller U4 or the box opening/closing detection circuit. When the wireless earbud is entered into the box, the charging control switch U6 is controlled to be turned on. When the wireless earbud is taken out of the charging box, the charging control switch U6 is controlled to be turned off, so as to avoid the common terminal of the communication/charging switching circuit 230 and the charging output terminal being connected and the charging port 110 being charged when the wireless earbud is taken out of the box. Certainly, in other embodiments, it is also possible that when the charging box obtains the power of the wireless earbud and determines that the wireless earbud needs to be powered, the charging control switch U6 is controlled to be closed. In this embodiment, the charging control switch U6 and the communication/charging switching circuit 230 are provided. When both the charging control switch U6 and the communication/charging switching circuit 230 are connected at the same time, the output of the power supply 220 is realized, thereby preventing the charging port 110 from being charged when the wireless earbud does not need to be charged.

This disclosure further provides a charging system for a wireless earbud, which includes the wireless earbud as described above, and the charging box as described above.

For the detailed structures of the wireless earbud and the charging box, please refer to the above-mentioned embodiments, which will not be repeated here. It is understandable that since the charging system for the wireless earbud of this disclosure applies the above-mentioned wireless earbud and the charging box, the embodiments of the charging system for the wireless earbud of this disclosure includes all the technical solutions of all embodiments of the above-mentioned wireless earbud and the charging box, and the achieved technical effects are also completely the same, which will not be repeated here.

The above is only optional embodiments of this disclosure, and thus does not limit the scope of this disclosure, and the equivalent structural transformation made by the content of the specification and the drawings of this disclosure, or directly/indirectly applied to other related technical fields are all included in the patent protection scope of this disclosure.

What is claimed is:
1. A wireless earbud, comprising:
a charging port configured to be connected to an earbud charging voltage and receive/send a communication signal;
a communication switching circuit comprising:
a first input/output terminal connected to the charging port; and
a second input/output terminal; wherein:
the communication switching circuit is configured to switch to an off state when the charging port is con- nected to the earbud charging voltage, and switch to an on state when the charging port is connected to the communication signal;
a communication on-off circuit connected to the second input/output terminal of the communication switching circuit; and
an earbud control circuit configured to perform box entry detection on the wireless earbud and generate a corresponding detection signal to control the communication switching circuit to turn on/off an electrical connection between the earbud control circuit and the communication on-off circuit according to the detection signal;
the communication switching circuit further comprises:
a second MOS transistor, a source of the second MOS transistor being the second input/output terminal of the communication switching circuit, and a drain of the second MOS transistor being the first input/output terminal of the communication switching circuit; and
a first pull-up resistor, a first terminal of the first pull-up resistor being connected to a first DC power supply, and a second terminal of the first pull-up resistor being connected to a gate of the second MOS transistor.

2. The wireless earbud of claim 1, further comprising:
a charging on-off circuit, an input terminal of the charging on-off circuit being connected to the charging port, and the charging on-off circuit being configured to:
turn on to be connected to the earbud charging voltage when the charging port is connected to the earbud charging voltage; and
turn off to stop earbud charging when the charging port is connected to the communication signal.

3. The wireless earbud of claim 2, further comprising an energy storage component;
wherein the charging on-off circuit comprises:
a first MOS transistor, a source of the first MOS transistor being the input terminal of the charging on-off circuit, and a drain of the first MOS transistor being connected to the energy storage component of the wireless earbud;
a first resistor; and
a second resistor; wherein:
a first terminal of the first resistor is connected to a first DC power supply, a second terminal of the first resistor is grounded through the second resistor, and a common terminal of the first resistor and the second resistor is connected to a gate of the first MOS transistor.

4. The wireless earbud of claim 3, wherein:
the first MOS transistor is turned on when a voltage value output by the common terminal of the first resistor and the second resistor is less than a voltage value of the charging port; and
the first MOS transistor is turned off when the voltage value output by the common terminal of the first resistor and the second resistor is greater than or equal to the voltage value of the charging port.

5. The wireless earbud of claim 1, wherein the earbud control circuit comprises:
an earbud main controller, a data transmission terminal of the earbud main controller being connected to the communication switching circuit;
a position detection sensor, wherein:
an output terminal of the position detection sensor is connected to a controlled terminal of the communication switching circuit, and is configured to perform the box entry detection on the wireless earbud and generate the corresponding detection signal to control the communication switching circuit to turn on/off the electrical connection between the earbud control circuit and the communication on-off circuit; or
the output terminal of the position detection sensor is connected to the earbud main controller, and is configured to perform the box entry detection on the wireless earbud and generate the corresponding detection signal; the earbud main controller is further configured to control the communication switching circuit to turn on/off the electrical connection between the earbud control circuit and the communication on-off circuit according to the detection signal.

6. The wireless earbud of claim 2, wherein the earbud control circuit comprises:
an earbud main controller, a data transmission terminal of the earbud main controller being connected to the communication switching circuit;
a position detection sensor, wherein:
an output terminal of the position detection sensor is connected to a controlled terminal of the communication switching circuit, and is configured to perform the box entry detection on the wireless earbud and generate the corresponding detection signal to control the communication switching circuit to turn on/off the electrical connection between the earbud control circuit and the communication on-off circuit; or
the output terminal of the position detection sensor is connected to the earbud main controller, and is configured to perform the box entry detection on the wireless earbud and generate the corresponding detection signal; the earbud main controller is further configured to control the communication switching circuit to turn on/off the electrical connection between the earbud control circuit and the communication on-off circuit according to the detection signal.

7. The wireless earbud of claim 3, wherein the earbud control circuit comprises:
an earbud main controller, a data transmission terminal of the earbud main controller being connected to the communication switching circuit;
a position detection sensor, wherein:
an output terminal of the position detection sensor is connected to a controlled terminal of the communication switching circuit, and is configured to perform the box entry detection on the wireless earbud and generate the corresponding detection signal to control the communication switching circuit to turn on/off the electrical connection between the earbud control circuit and the communication on-off circuit; or
the output terminal of the position detection sensor is connected to the earbud main controller, and is configured to perform the box entry detection on the wireless earbud and generate the corresponding detection signal; the earbud main controller is further configured to control the communication switching circuit to turn on/off the electrical connection between the earbud control circuit and the communication on-off circuit according to the detection signal.

8. The wireless earbud of claim 4, wherein the earbud control circuit comprises:
an earbud main controller, a data transmission terminal of the earbud main controller being connected to the communication switching circuit;
a position detection sensor, wherein:
an output terminal of the position detection sensor is connected to a controlled terminal of the communication switching circuit, and is configured to perform the box entry detection on the wireless earbud and generate the corresponding detection signal to control the communication switching circuit to turn on/off the electrical connection between the earbud control circuit and the communication on-off circuit; or the output terminal of the position detection sensor is connected to the earbud main controller, and is configured to perform the box entry detection on the wireless earbud and generate the corresponding detection signal; the earbud main controller is further configured to control the communication switching circuit to turn on/off the electrical connection between the earbud control circuit and the communication on-off circuit according to the detection signal.

9. The wireless earbud of claim 1, wherein the earbud control circuit comprises:

an earbud main controller, a data transmission terminal of the earbud main controller being connected to the communication switching circuit;

a position detection sensor, wherein:

an output terminal of the position detection sensor is connected to a controlled terminal of the communication switching circuit, and is configured to perform the box entry detection on the wireless earbud and generate the corresponding detection signal to control the communication switching circuit to turn on/off the electrical connection between the earbud control circuit and the communication on-off circuit; or the output terminal of the position detection sensor is connected to the earbud main controller, and is configured to perform the box entry detection on the wireless earbud and generate the corresponding detection signal; the earbud main controller is further configured to control the communication switching circuit to turn on/off the electrical connection between the earbud control circuit and the communication on-off circuit according to the detection signal.

10. The wireless earbud of claim 5, wherein the earbud control circuit further comprises:

a second pull-up resistor, one terminal of the second pull-up resistor being connected to the first DC power supply, and the other terminal of the second pull-up resistor being connected to a communication terminal of the earbud main controller.

11. A charging system for a wireless earbud, comprising the wireless earbud as recited in claim 1, and a charging box, the charging box comprising:

a power interface configured to be connected to an earbud charging voltage and receive/send a communication signal;

a power supply configured to output the earbud charging voltage;

a communication/charging switching circuit comprising:
a common terminal connected to the power interface;
a charging output terminal connected to the power supply; and
a communication transmission terminal;

a charging box main controller, a data transmission terminal of the charging box main controller being connected to the communication transmission terminal of the communication/charging switching circuit, and the charging box main controller being configured to control the communication/charging switching circuit to switch between an electrical connection between the common terminal and the charging output terminal and an electrical connection between the common terminal and the communication transmission terminal.

12. The charging system of claim 11, wherein the charging box further comprises a charging control switch, the charging control switch comprising:

a controlled terminal connected to the charging box main controller;

an input terminal connected to the power supply; and an output terminal connected to the charging output terminal of the communication/charging switching circuit.

* * * * *